March 21, 1967 T. W. DUNCAN ETAL 3,310,243
DISHWASHING MACHINE

Filed Jan. 6, 1965 8 Sheets-Sheet 1

INVENTORS.
THOMAS W. DUNCAN AND
CHARLES N. PERIN,
BY Yungblut, Melville,
Strasser & Foster,
ATTORNEYS.

March 21, 1967 T. W. DUNCAN ETAL 3,310,243
DISHWASHING MACHINE

Filed Jan. 6, 1965 8 Sheets-Sheet 5

INVENTORS
THOMAS W. DUNCAN AND
CHARLES N. PERIN,
BY Yungblut, Melville,
Frasier & Foster,
ATTORNEYS.

March 21, 1967 T. W. DUNCAN ET AL 3,310,243
DISHWASHING MACHINE
Filed Jan. 6, 1965 8 Sheets-Sheet 6

INVENTORS
THOMAS W. DUNCAN AND
CHARLES N. PERIN,
BY Yungblut, Melville,
Strauss & Foster,
ATTORNEYS.

March 21, 1967  T. W. DUNCAN ETAL  3,310,243
DISHWASHING MACHINE

Filed Jan. 6, 1965  8 Sheets-Sheet 7

INVENTORS.
THOMAS W. DUNCAN AND
CHARLES N. PERIN,
BY *Youngblut, Melville Stadler & Foster,*
ATTORNEYS.

United States Patent Office 3,310,243
Patented Mar. 21, 1967

3,310,243
DISHWASHING MACHINE
Thomas W. Duncan and Charles N. Perin, Connersville, Ind., assignors to Design and Manufacturing Corporation, Connersville, Ind., a corporation of Indiana
Filed Jan. 6, 1965, Ser. No. 423,649
10 Claims. (Cl. 241—101)

This invention has to do with dishwashing machines of a type having a vat or tub containing upper and lower racks for tableware and a means such as a spray arm for delivering detergent solution or rinse water to the tableware. It is related to the copending application of the present inventors entitled, Dishwashing Machine, Ser. No. 318,732, filed Oct. 24, 1963, now Patent No. 3,179,307, dated Apr. 7, 1965.

In this type of machine the vat will have a sump formed in its bottom and there will be a motor mounted below the sump. The motor drives two impeller pumps. One of these is located below the bottom of the sump so as to receive water or solution from the vat. This pump serves, when driven in one direction, to withdraw water from the vat and exhaust it to a drain through suitable conduit means as known in the art. In some forms of apparatus this pump, when driven in the opposite direction, delivers water withdrawn from the vat to an upper spraying head located within the vat and beneath the upper tableware rack. In other forms of the machine the first mentioned pump when driven in the second mentioned direction, is essentially inactive or serves merely to produce some agitation of the water or solution in the bottom of the vat; all as will be more fully explained hereinafter.

In the type of dishwashing machine to which this invention is addressed, the motor also drives a second pump, located above the first pump and serving to feed a spray arm pivotally mounted beneath the lower rack. The invention is applicable both to top opening and to side opening dishwashing machines. In many of these the upper rack will preferably be mounted so as to revolve within the vat.

Plural pump dishwashing machines of the type where one of the pumps is located below the sump or bottom of the vat and the other pump is located in spaced relationship within the sump or vat, give rise to certain problems. The water or solution preferably enters both pumps from the space between them, and there are problems related to the controlling of the fllow of water to the two pumps, the prevention of swirling of the water or solution between the pumps, and the like. Over and above these problems, attention must be given to the fact that many housewives are careless in the manner in which they use their dishwashing machines. While plates and other tableware should be scraped and preferably rinsed before the ware is placed in the racks, this is not always done. As a result, foreign materials are introduced into the vat ranging in nature from olive pits to pieces of meat and the ingredients of stews, salads and the like which may again range from pieces of vegetables such as potatoes and carrots to lettuce leaves and stringy substances such as celery. Pasty materials such as mashed potatoes, congealed gravies etc. are also encountered. Occasionally through accident or carelessness, pieces of metal may be introduced into dishwashing machines, such as nuts and bolts.

It has hitherto been realiezd that foreign substances may find their way into dishwashing machines and various expedients have been proposed to handle the situation. In some constructions, a screen has been placed around the water inlet to the pumps; but the difficulty here is that the screen soon becomes clogged with foreign matter, and the flow of water is impeded so that the pumps are starved. Also the disassembly of the dishwashing machine operating instrumentalities in order to permit the cleaning of a screen or the pumps themselves is inconvenient and time consuming; yet such cleaning must be accomplished since otherwise there may be putrefaction of food substances and consequent odors.

Attempts have also been made to provide for the maceration of softer materials, e.g. where the vanes of an upper pump are caused to revolve in close proximity to stationary vanes on a flow directing device. But this also presents difficulties (whether the stationary vanes are located ahead of or behind the rotating vanes of the pump) in that harder foreign materials in the dishwasher are not prevented from striking the rotating vanes. This causes impeller or vane breakage. Moreover, where there is a complicated system of vanes ahead of the upper pump, these vanes themselves may become clogged with softer food materials thus cutting off the flow of water to the pump. Yet again, complicated constructions located between the upper and lower pumps are very difficult to clean if food materials should collect in them or in the space between the pumps.

One of the objects of this invention is to provide means for controlling the flow of water to the first and second pumps during the washing and rinsing cycles in dishwashing machines of the type mentioned. Hereinafter the term "water" will be used to include both washing solutions, i.e. solutions containing detergent substances, as well as rinse water employed in the various cycles of operation of the machine.

Another object of the invention, of utility in that type of dishwashing machine which has no upper spray head, is to provide a means for rendering the lower pump essentially inoperative when driven in one direction.

But a more important object of the invention relates to the control of foreign materials carelessly or inadventently introduced into the dishwashing machine. This object has a number of subdivisions:

(a) It is an object of this invention to provide a macerating means acting upon softer foodstuffs ahead of the second or upper pump, such that the foodstuffs can be reduced to a condition of fine enough subdivision to pass through flow directing assemblies, pumps, spray arms and spray heads, so as not to interfere with the operation of the machine nor starve the upper pump. A sufficient subdivision of the foreign materials will insure that macerated substances will be removed from the vat with the initial washing solution.

(b) It is an object of the invention to provide means for the differential feeding of the pumps of such character as to prevent hard objects (such as bone fragments, olive pits, nuts and bolts) from reaching the pump impellers, and (c) It is an object of the invention to provide a structure which may easily be cleaned without disassembly if there should be an accumulation of unmacerated substances, particularly in the space between the upper and lower pumps.

It is also an object of the invention to provide improved means located between the pumps for preventing the swirling of the water feeding the pumps.

These main objects and ancillary ones which will be pointed out hereinafter, or will be apparent to one skilled in the art upon reading these specifications, are accomplished by that certain structure and arrangement of parts of which an exemplary embodiment will now be described. Reference is made to the accompanying drawings wherein.

Figure 1:
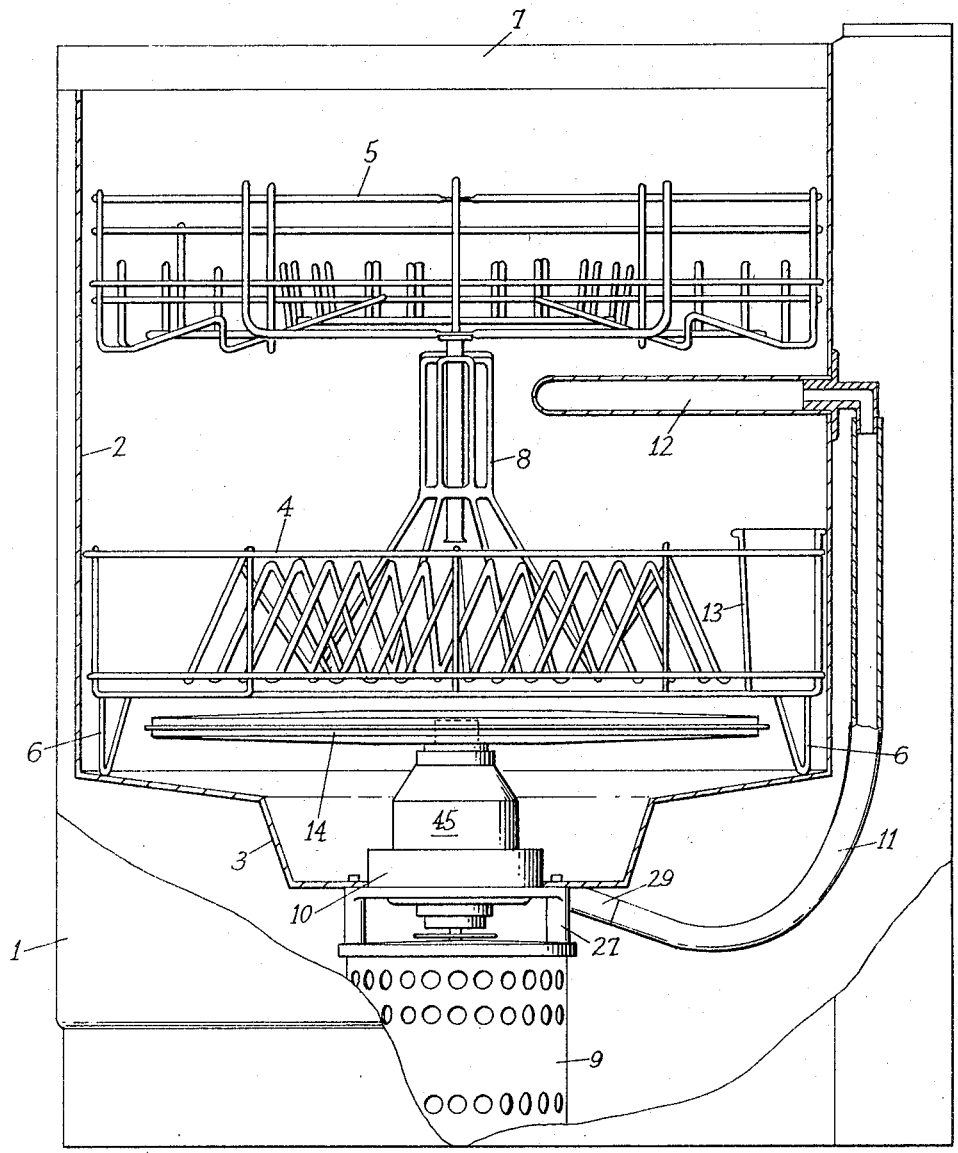
FIG. 1 is an elevational view, with parts in section, of an exemplary dishwashing machine of this invention.

Referring first to FIG. 1, there is shown an exemplary form of dishwasher of this invention comprising a housing 1, containing a vat 2. The vat has a sump generally indicated at 3. A lower rack for tableware is shown at 4, and an upper rack at 5. The lower rack may have any desired configuration found suitable for the reception of tableware such as plates, saucers, cups, pots and pans, and pot and pan lids.

The upper rack 5 is preferably mounted for rotation. This may be done on separate supporting means as in U.S. Patent No. 2,799,285 or, as illustrated in FIG. 1, it may be mounted upon a vertical shaft supported on an upwardly projecting central portion 8 of the lower rack. In the top opening dishwasher (which is the style illustrated in FIG. 1, and which has a lid 7) the top rack 5 will either be removable as such or it may have hinged portions permitting access to the bottom rack, as shown in U.S. Patent No. 3,035,706. Where the lower rack 4 has an upstanding central portion 8, for the purpose described above, it is most convenient to provide a perforated container of metal or plastic 13 at the side of the lower rack for knives, forks, spoons and like utensils.

Also shown in FIG. 1 is a bracket or suspension means 27 which is attached at the top about the edges of a hole in the bottom of the sump and which has depending legs, all as hereinafter described, for the mounting of the motor 9.

The numeral 10 in FIG. 1 marks a purely diagrammatic showing of a double pump assembly which will hereinafter be outlined in greater detail. Above this there is shown a housing means 45, later also fully described. A spray arm 14 is rotatably mounted at the top of this housing. It receives water from the upper pump and delivers it against tableware located in the rack 4. In the particular embodiment shown, an outlet 29 of the lower pump feeds water through a conduit 11 to a spray head 12, located below the upper rack. The spray head has orifices particularly in its upper section, for delivery jets of water against the tableware in the upper rack 5. Preferably the orifices are so directed that the jets cause a rotation of the upper rack, although this does not constitute a limitation on the invention. In some structures the upper spray head 12 is omitted as will later be set forth. It will be evident from FIG. 1 and the accompanying description, that the same or similar structures may be employed in front or side opening dishwashers without departing from the spirit of this invention.

Figure 2:
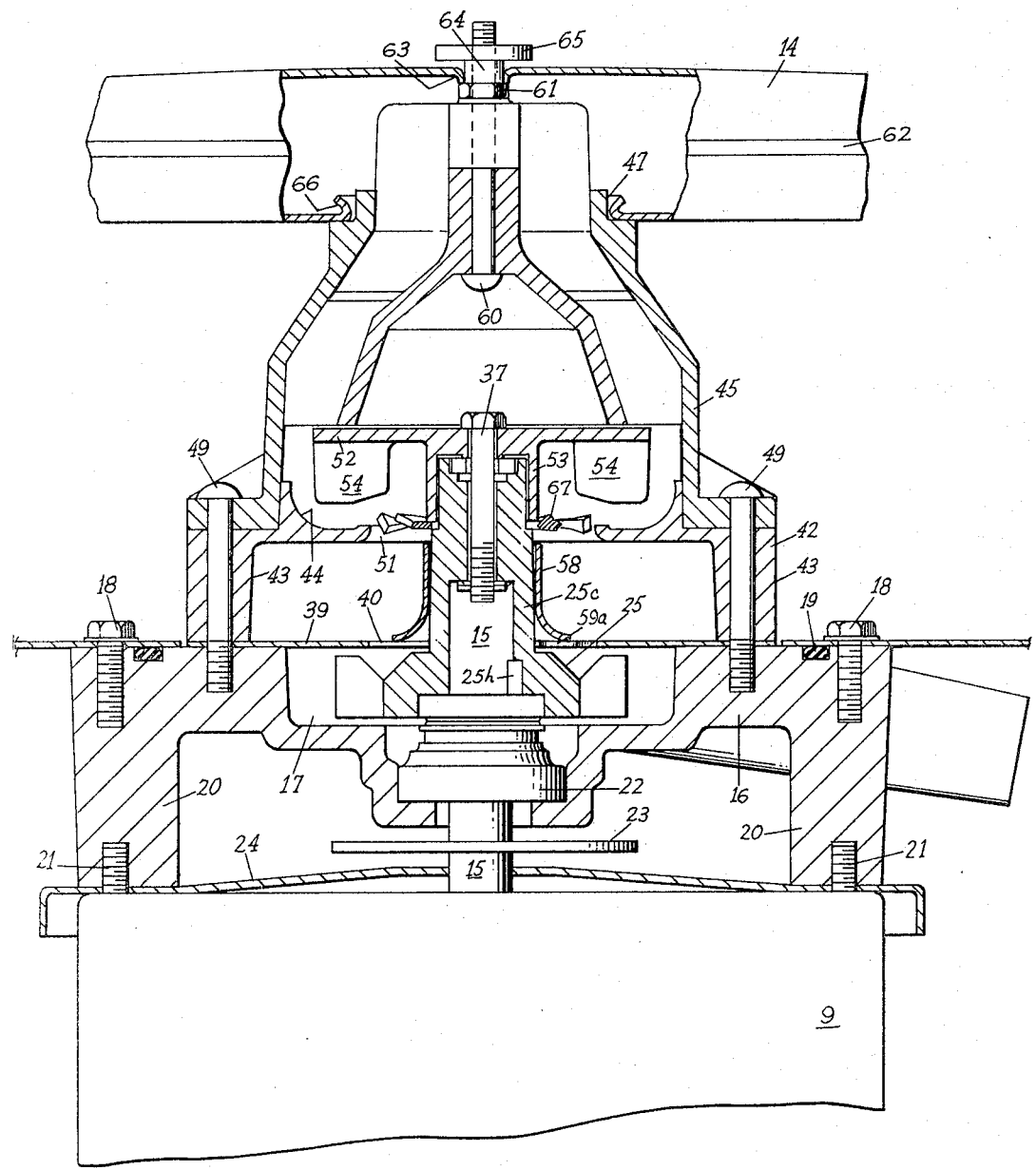
FIG. 2 is an enlarged partial vertical cross sectional view showing a portion of the vat sump, a portion of the motor, the motor mounting, the first and second pumps and a portion of the pivoted spray arm.

Referring now to FIG. 2, the motor 9 has a driven shaft 15 extending upwardly through the bottom of the sump 3. The fixture generally indicated at 16 also serves as a housing for the lower pump and hereafter said fixture will be referred to as the lower pump housing. The lower pump housing is fastened to the bottom wall of the sump by a series of bolts 18. A seal is effected between the bottom wall of the sump and the lower pump housing 16 by any suitable means such as a gasket or the O-ring shown at 19. The motor 9 is mounted as by means of bolts 21 to depending legs 20 on the lower pump housing 16 so that the motor hangs from the housing. Disassembly of the motor from the housing 16 or disassembly of the housing from the walls of the sump is not ordinarily required unless trouble develops in the motor itself.

The hollow interior 17 of the lower pump housing has a central downward extension adapted to hold a seal member 22 surrounding the motor shaft 15. This seal may be of any conventional form, and its object is to prevent leakage of water from the pump housing downwardly around the motor shaft. The motor shaft may also have affixed to it a water slinger disc 23 which, rotating with the shaft, will serve to throw laterally any water which may get past the seal. A water deflecting cap 24 for the motor housing, may be engaged between said housing and the legs 20 as shown.

The motor shaft 15 drives an impeller 25 for the first pump, as more fully described later.

Figure 3:
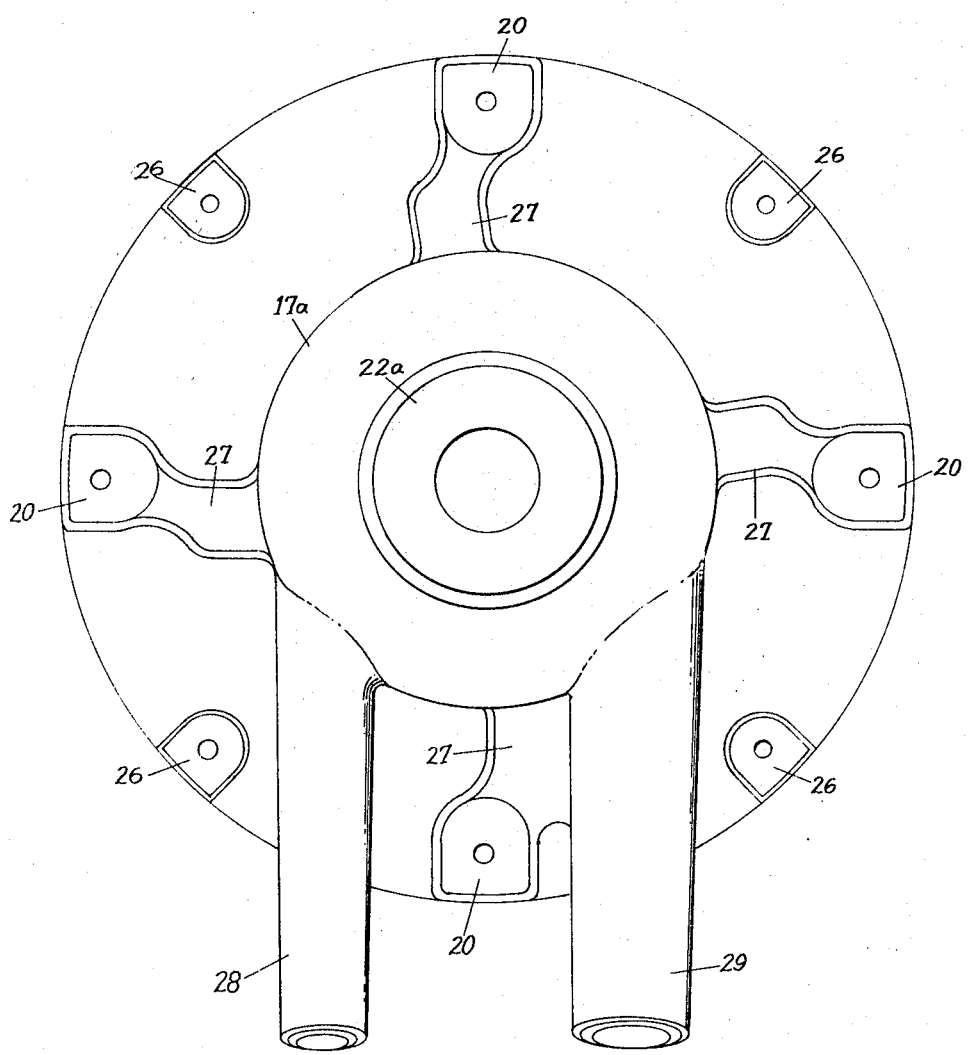
FIG. 3 is a bottom plan view of one form of the housing of the first or lower pump.
Figure 4:
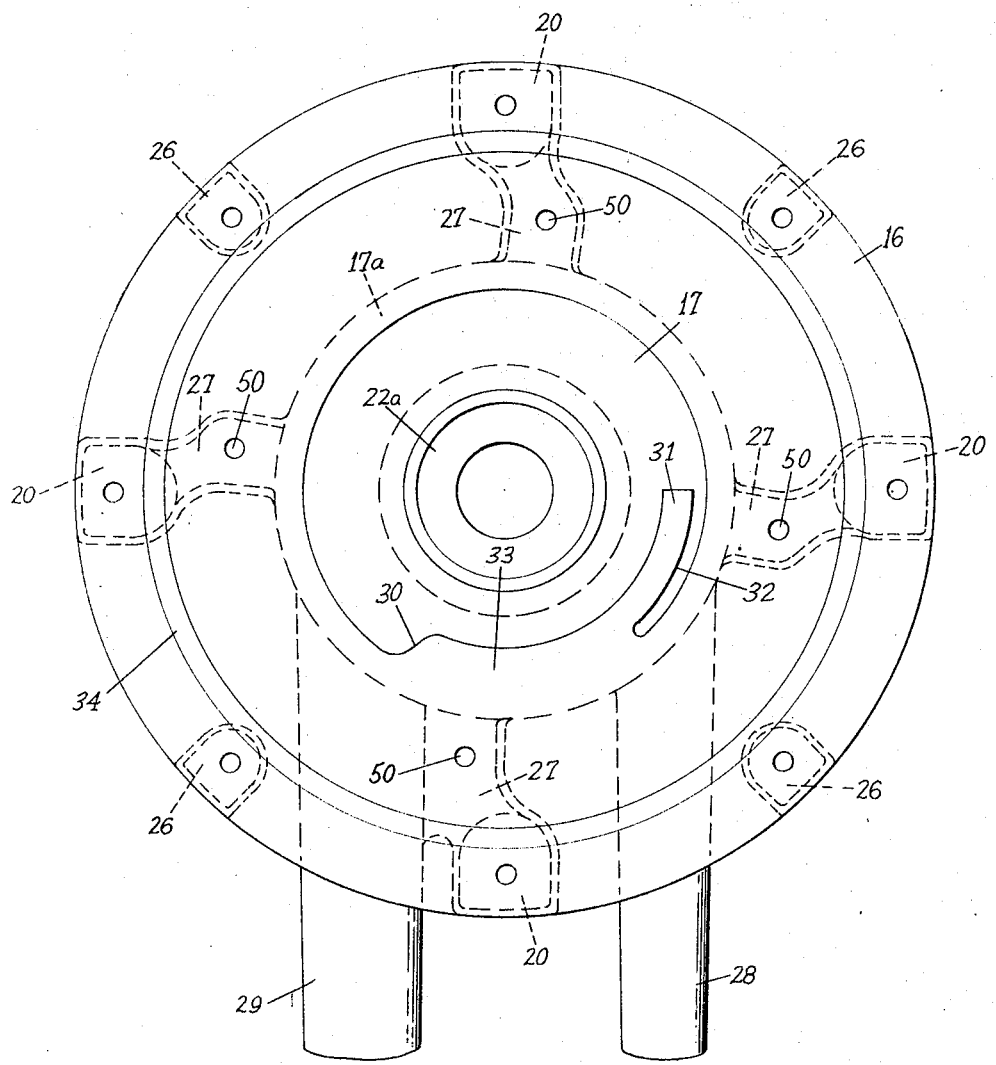
FIG. 4 is a top plan view of the same first pump housing.

FIGS. 3 and 4 are respectively bottom and top views of one form of the lower or first pump housing. It will be seen in FIG. 3 that the housing fixture is a circular member having a top of plate-like configuration at its periphery, excepting for the legs 20, certain lug-like members 26 intermediate the legs, which members are perforated and threaded for the reception of more of the bolts 18, and excepting for some thickening webs 27, which may be drilled and tapped for the receipt of bolts hereinafter described. FIG. 3 also shows the outer surface of the seal-receiving depression 22a, and the larger pump housing depression 17a. It will also be noted that two hollow outlet members, to which conduits may be attached, are connected with the portion 17a. The somewhat larger member 29 will be connected by the conduit 11 shown in FIG. 1, with the spray tube 12 in that figure. The other outlet member 28 will be connected by a conduit (not shown) with the drain.

The rotor or impeller 25, later described in more detail, has a plurality of radially extending vanes and acts as a centrifugal impeller when the pump is in operation. Reference to FIG. 4, in which like parts are given like index numerals, will indicate the configuration of the hollow interior 17 of the pump housing. For the most part, the portion 17 has a circular periphery; but adjacent the outlet member 29 there is an interior shoulder 30, and adjacent the outlet member 28 there is an arcuate wall 31 spaced from the interior periphery of the member 17 and providing a passageway 32. The diameter of the impeller 25 is such that there is a minimum clearance effected between it and the wall 33 formed between 30 and 31. While the impeller itself is not shown in FIG. 4, it will be understood that when the impeller is rotating in the counterclockwise direction, the water trapped between the straight vanes of the impeller and the wall 33 will be rotated at the same rate as the impeller; thus, this portion of the water will pass the end of the arcuate wall 31 at such a velocity as to cause a negative air pressure in the passageway 32. This is sometimes referred to as "aspiration." As this water is thrown outwardly by centrifugal force upon leaving the confines of the wall 31, its velocity head is converted to a pressure head, as is common to the principle of centrifugal pumps. This pressure head then forces the water out of the outlet member 29. Since there is relatively little pressure head generated in the area of the entrance to passageway 32, and since the air pressure in the passageway 32 is less than atmospheric, due to the aforementioned aspiration effect, negligible water is lost through outlet 28 when the impeller is rotated in the counterclockwise direction. The straight vanes, although less efficient than the curved ones used on the second impeller as at 54, are necessary for the aspiration effect in that the trapped water referred to above, is carried past the opening to the passageway 32, and not forced into it as would be the result of tangential flow off the ends of curved vanes. It should be understood that there is a definite and precise balance necessary between the size and shape of the openings into and from the pump housing in order for the system to function as desired. The motor which drives the lower pump is reversible. Upon reversal of the motor 9, the impeller rotates in a clockwise direction, and the water will again be thrown outwardly with creation of a pressure head. The rotation of the water plus the pressure head created will force the water out through the passageway 32 and thus into the outlet 28.

FIG. 4 shows at 34 a circular groove for the reception of the O-ring 19.

Figure 5:
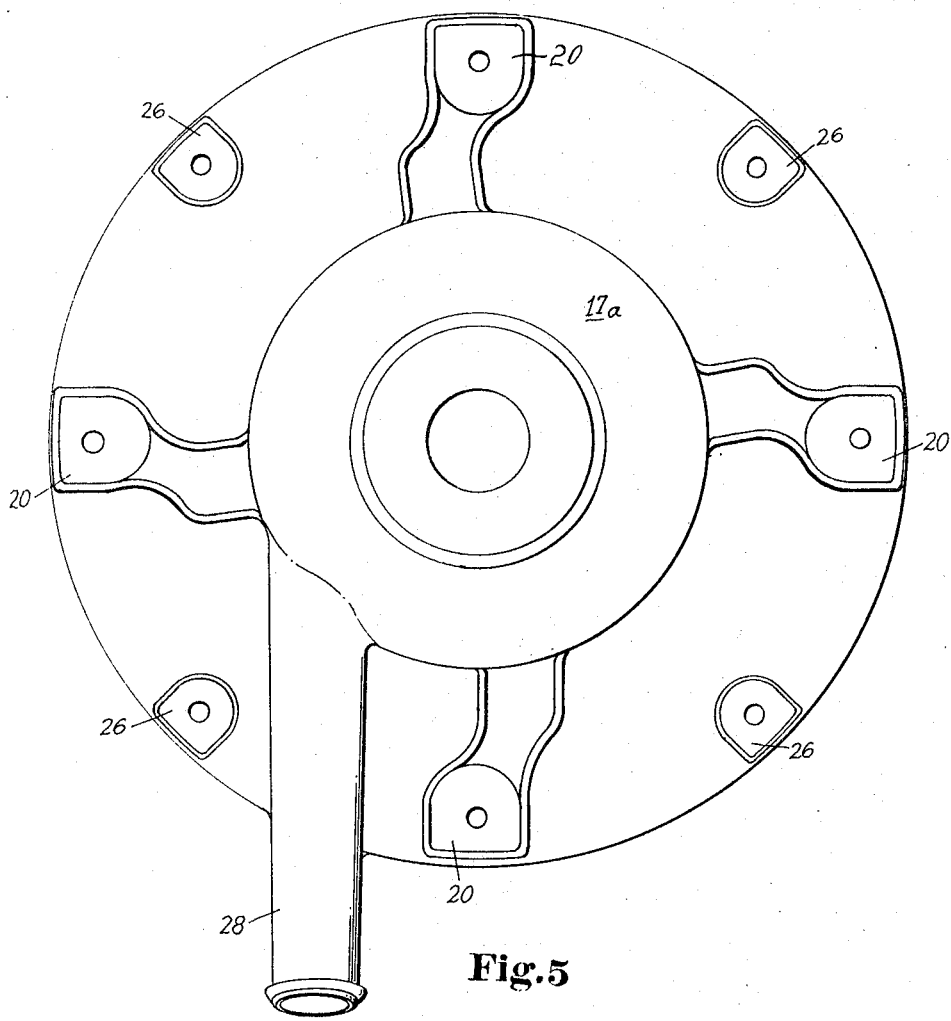
FIG. 5 is a bottom plan view of another form of housing for the first or lower pump.
Figure 6:
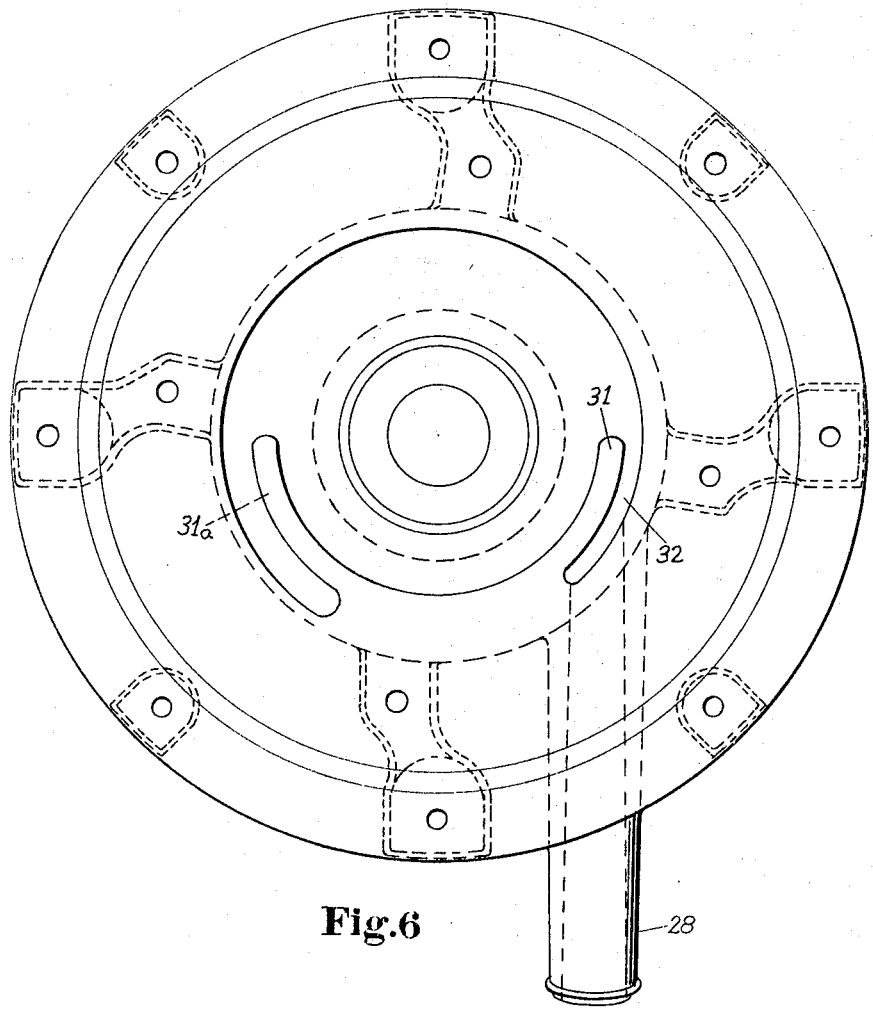
FIG. 6 is a top plan view of the same first pump housing.

In the event the dishwashing machine does not have an upper spray head 12, the type of housing shown in FIGS. 5 and 6 is used. Like index numerals have again been used to indicate like parts. But it will be noted from the figures that while the plate has a drain member 28 bearing the same relationship to the wall 31 and the passageway 32 as described above (so that clockwise rotation of the impeller in FIG. 6 will exhaust water in the vat to the drain) the fixture wholly lacks any outlet means such as that shown at 29 in FIGS. 3 and 4.

The structure thus far described for a pump which will deliver water to a conduit only when driven in one direction will be recognized as present. However, as shown in FIG. 6 a second arcuate wall 31a similar to the wall 31 but extending in the opposite direction is provided, and in connection therewith a cover plate is used which has an elongated orifice overlying the space between the wall 31a and the inner periphery of the pump housing, the said orifice having approximately the size and shape shown in dotted lines at 31b in FIG. 9. The passage of water through such an orifice returns it to the sump where it has the effect merely of increasing turbulence therein.

Figure 7:
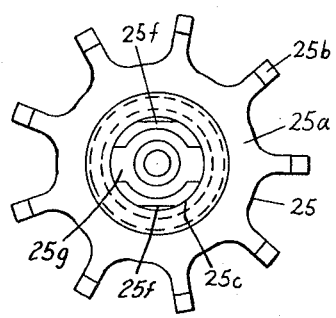
FIG. 7 is a plan view of the first pump impeller.
Figure 8:
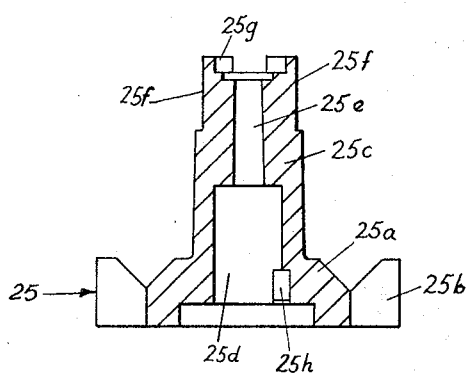
FIG. 8 is a vertical section of the first pump impeller.

The impeller 25 for the lower pump is detailed in FIGS. 7 and 8. It has a central hub portion 25a, outlying vanes 25b and an upwardly extending shaft-like portion 25c. The hub and the lower part of the shaft-like portion 25c are hollowed out centrally as at 25d to receive the upper end of the motor shaft 15. There is a central hole 25e for the passage of a screw, later described, by means of which the impeller of the upper pump may be fastened to the motor shaft. The upper portion of the extension 25c is flattened at opposed lateral portions 25f for the reception of a macerating means later described. It also has at the top a configuration 25g which insures a non-rotatable connection to the impeller of the upper pump. The lower pump impeller is splined or keyed to the motor shaft as indicated at 25h in FIGS. 2 and 8.

The housing for the lower pump is completed on its upper side by a plate 39 already mentioned. This plate is held to the lower pump housing 16 in a way which will be outlined later. It is provided with a central opening 40 through which water from the sump can reach the lower impeller.

Figure 9:
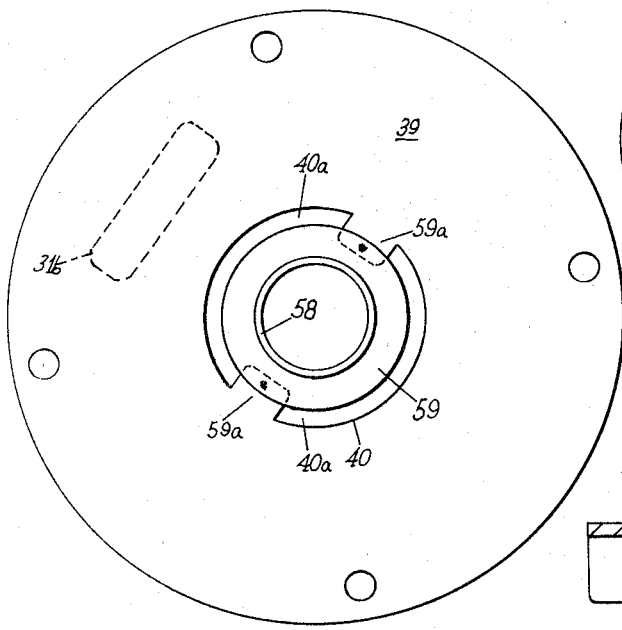
FIG. 9 is a plan view of a plate member serving as a cover for the first pump housing and including anti-swirl means.
Figure 10:
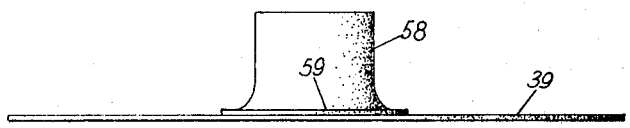
FIG. 10 is an elevational view of the structure of FIG. 9.

The plate 39 is detailed in FIGS. 9 and 10. It is provided with a member in the form of a stamping having a substantially cylindrical portion 58, and a disc-like portion 59. The cylindrical member is spot welded or otherwise attached to the tabs 59a on plate 39 as shown in FIG. 9. It will be noted in FIG. 2 that the substantially cylindrical portion 58 loosely surrounds the upward extension 25c of the lower pump impeller. It will be noted from FIG. 9 that the disc shaped portion 59 of the stamping has a somewhat smaller diameter than the hole 40 in the plate 39. This restricts the entrance to the lower pump to a relatively narrow and substantially annular slot 40a. The total cross sectional area of the various parts of this slot is sufficient for the feeding of the lower pump; but at the same time the slot is so narrow that relatively large pieces of solid matter, including olive pits, nuts and bolts and the like will not pass through it. In fact, the only unmacerated solid materials likely to be encountered in even a carelessly used dishwashing machine which are capable of passing through the annular slot 40a are very thin slivers of china or glass which might be chipped from the surface of carelessly handled tableware. If these slivers are small enough to pass partially through the annular slot 40a, they will generally have so thin a cross section that they may be broken up by the lower impeller without substantial damage to the impeller itself. Otherwise any fragments of solid substance capable of passing through the slot 40a will be small enough in size to exit from the lower pump through the outlet means 28 or 29 as the case may be.

Hitherto difficulty has been had with drainage pumps in dishwashing machines because of the tendency of the water to swirl before it reaches the entrance to the pump; and it has been understood that vanes arranged radially around the pump entrance were necessary to control the swirling. However, it has been found in the practice of the invention that the tendency toward swirling is produced substantially entirely by the rotation of a shaft-like element such as the upward extension 25c of the lower pump impeller. In the present structure this rotating portion is effectively covered by the substantially cylindrical element 58 and swirling does not occur.

Various structural members lie above the lower pump and are entirely supported by the pump housing member 16. These elements include the heretofore mentioned plate 39 and its appurtenances, a spacing member having deflecting surfaces, a housing for the second or upper pump which also serves as a support for a diffuser or flow-controlling means, and a support for the rotating spray arm 14. These elements will now be described in order.

Still referring to FIG. 2, the spacing member comprises a horizontal platform portion 42 with spaced depending legs 43. On its upper surfaces the platform portion of the spacer has an annular arcuate surface 44 the purpose of which will later be described.

Figure 15:
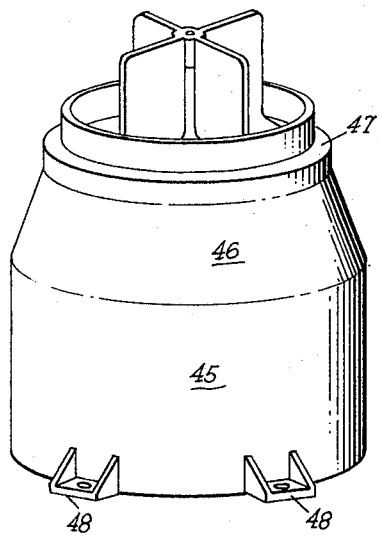
FIG. 15 is a perspective view of a housing for the upper pump showing certain stationary flow-directing vanes and a ledge for mounting the spray arm.
Figure 16:
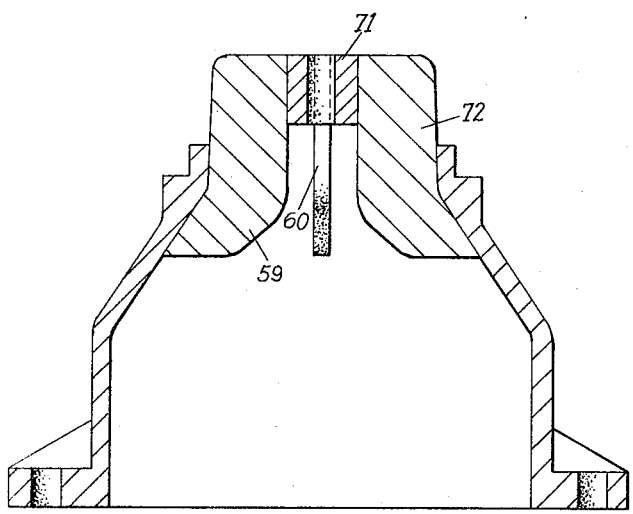
FIG. 16 is a vertical cross sectional view of the upper pump housing.

There is a hollow member, hereinafter called for convenience the housing of the upper pump, which is best shown in FIGS. 2, 15 and 16. This housing member has a cylindrical body portion 45, surmounted by a tapered or conical portion 46. The upper end of the portion 46 is stepped as shown at 47. The cylindrical portion of the housing 45 is provided at its lower end with certain radially disposed foot portions 48 which correspond in spacing to the legs 43 on the platform member 42 of the spacer. It can be seen in FIG. 2 how these various members including the plate 39 are held to the housing 16 of the first pump by elongated bolts 49. The bolts 49 are engaged in threaded recesses (50, FIG. 4) passing partially through the webs 27.

The platform member 42 of the spacer has a central opening 51, and it will now be appreciated, by reference to FIG. 2, that water from the sump enters the space between the first and second pumps by passing between the legs 43 of the spacer member. Some of the water may pass downwardly into the lower pump through the annular slot 40a. Another portion of the water may pass upwardly through the opening 51 in the spacer member 42 so as to enter the second or upper pump.

Figure 11:
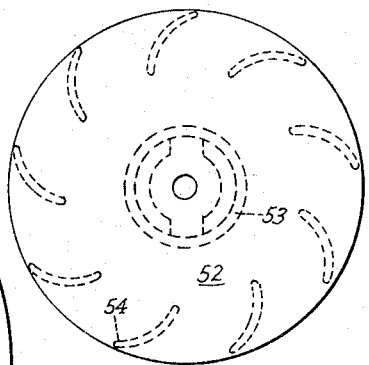
FIG. 11 is a top plan view of the impeller of the upper pump.
Figure 12:
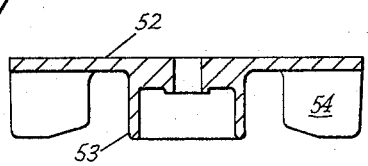
FIG. 12 is a vertical section thereof.

The impeller for the second pump is shown in vertical section in FIG. 12 and in plan in FIG. 11. It has a disc-like body 52, a depending hub 53, and shaped to have a non-rotative connection with the hub portion 25c of the first pump impeller. It also is characterized by peripheral depending vanes 54 lying generally opposite the arcuate surface 44 of the spacer member. The impeller of the second pump also has a centrifugal action; but its vanes 54 are curved in configuration, as shown in FIG. 11. This makes the impeller much more efficient in its centrifugal action when turning in a counterclockwise direction as viewed from above. It is substantially less efficient as a centrifugal pump when turning in the clockwise direction; and since this direction corresponds with the direction of rotation of the impeller 25 of the first pump during the operation of emptying the vat, it will be seen that the second pump of the device of this invention will tend to accept less water during a draining operation. During a washing or rinsing operation when the second pump will be delivering water to the rotating spray arm and the first pump will be delivering water through the conduit 11 to the spray nozzle 12 in the vat, the capacity of the second pump will be much greater.

Figure 19:
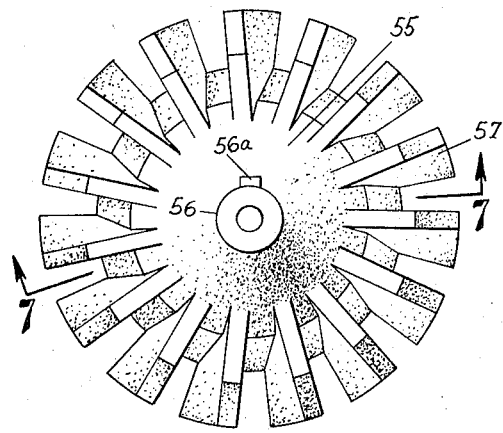
FIGS. 18 and 19 are respectively elevational and plan views of the same flow-directing means.
Figure 17:
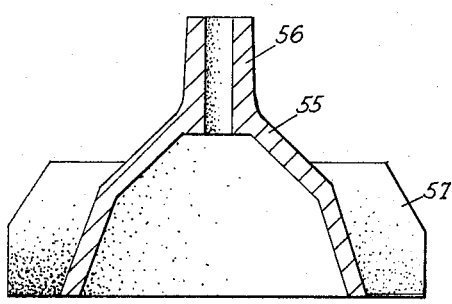
FIG. 17 is a vertical cross sectional view taken on the line 7—7 of FIG. 19 of flow-directing means fitting within the housing of FIG. 15.
Figure 18:
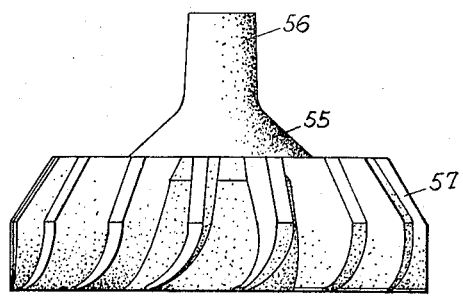

Water moved in the centrifugal direction by the impeller of the upper pump will be deflected or diverted by the arcuate surface 44 of the spacer member so as to tend to move upwardly or in an axial direction within the housing portion 45. The water so moved will tend to have a circular or swirling motion which is undesirable. To correct the flow of the water delivered by the second pump, use is made of a diffuser next to be described. Reference is made to FIGS. 17, 18 and 19 wherein it will be seen that the diffuser has a generally tapering hollow body portion 55 terminating upwardly in a hollow neck portion 56. Vanes 57 are formed on the outer surface of the diffuser, and as can be seen in FIGS. 18 and 19 these vanes are preferably curved at least at their bottom portions. The upper portion of these vanes is preferably vertical, so that all swirling action has stopped before the water enters the conical portion of the housing. The water from the second pump passes upwardly between the housing member and the outer portion of the body of the diffuser. The vanes 57 of the diffuser minimize or eliminate the swirl of the water during the passage of the water through the tapering hollow body portion of the housing to prevent that substantial pressure loss which occurs when rapidly rotating fluid is forced into a converging cone.

FIG. 16 shows that above the top of the second pump housing member there is a short hollow hub 71 supported from the housing member by four straight vanes 72, forming a spider. The diffuser of FIGS. 17, 18 and 19 is mounted to this hub by means of a bolt 60 passing through the hollow neck 56 of the diffuser and through the hub 71, and held in place by a nut 61. The rotating spray arm 14 is conveniently formed from two stamped hollow sheet metal members with lateral flange portions on either side as shown at 62 in FIG. 2. The flange portions may be crimped or otherwise fastened together to form a hollow spray arm closed at its ends; and it will be understood that the spray arm on its upper surface will have openings to form jets for washing the tableware in the lower rack and for rotating the spray arm as previously described. The upper member of the spray arm is formed with a small flanged opening 63 at its center which has a bearing on a bushing or sleeve 64 placed over the extending upper end of the bolt 60, and held in place by a knurled or otherwise easily removable nut 65. The lower member of the rotating spray arm 14 may be provided with a larger flanged opening 66 capable of riding in the step 47 formed at the outer top surface of the second pump housing member.

Various parts of the apparatus thus far described may be made in various ways from various materials. Where substantial strength is a necessity, as in the first pump housing, a casting of iron or light metal is preferably employed. Other parts such as the first pump impeller 25, the spacer member, the second pump impeller and the diffuser may be made of metal die castings or even from suitably strong molded plastics. The second pump housing, which again may be made either of die cast metal or of plastic, preferably has the vanes 72 and the hub 71 formed integrally with it. The external dimensions of the diffuser vanes are preferably such that the diffuser has a tight fit within the second pump housing, and rotation is prevented by the bearing of key 56a (FIG. 19) against vanes 72 (FIG. 16).

Figure 13:
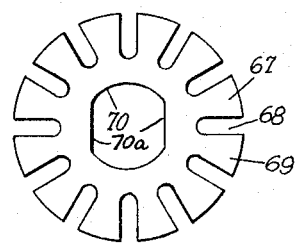
FIG. 13 is a plan view of a stamping for a macerator.

The opening 51 in the upper support member 42 is of relatively large size; and it is a feature of this invention that a macerating means 67 is located in this opening and substantially coplanar with the platform portion 42 of the support for the upper pump. This macerating means is detailed in FIGS. 13 and 14. It is preferably initially formed by die cutting a relatively heavy sheet metal element into the shape of a disc having a diameter very nearly equal to the diameter of the opening 51. The disc-like element is provided with a series of radial slots 68, dividing its periphery into a series of teeth 69. It is also provided with a central opening 70 which is configured with flat sides 70a as shown so that the disc may be slipped over the upward extension 25c of the lower pump impeller with the flat side 70a of the macerating means engaging the flat sides 25f of extension 25c, thereby non-rotatably connecting the macerating means to the lower pump impeller. So long as the impeller of the upper pump is held in position by the bolt 37, the hub 53 will keep the macerating means in position on the lower pump impeller extension.

Figure 14:
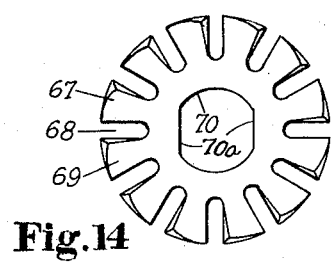
FIG. 14 is a plan view showing the macerator in final form.

The macerator 67 is preferably treated by twisting the several teeth 69 propeller-wise through an angle such that the water delivery through the macerator to the upper impeller is compatible with the normal delivery of the upper impeller. In the exemplary embodiment this angle is about 34°. This is illustrated in FIG. 14. If the macerator is made of hardenable steel, it may be hardened after it attains its final form. The twisting of the teeth exposes relatively sharp edges thereon which are capable of cutting into foodstuffs of maceratable character including but not limited to raw carrots, raw potatoes, celery and like vegetable substances. The macerator operates because it is driven at high speed by the operating motor; and it has been found capable of disintegrating stringy substances such as celery or the fibers of meat. The width of the slots 68 and the distance between the peripheries of the macerator and the opening 51 in the spacing means are such that pieces of hard substance including olive pits, nuts, bolts and the like are prevented from entering and damaging the upper pump. Any pieces of substance small enough to pass through the macerator will also pass through the openings in the spray arm 14 and the arcuate slot 40a so that any such substances will be removed from the vat either during the draining operation following the first washing cycle or during the draining operations following subsequent washing or rinsing cycles.

If solid substances which cannot be macerated are introduced into the washing machine, they will collect in the space between the upper and lower pumps. But because there are no anti-swirl vanes in the structure of this invention, this space is readily cleaned and generally without disassembly of any part of the machine. A brush or like means may be passed into the space between the pumps by inserting it between the legs 43 of the upper pump support. Thus such materials may be moved out into the open portion of the sump for ready removal.

At the same time, the assembly of this invention is easily taken apart if this should be found desirable. The spray arm 14 can be removed by unscrewing the knurled nut 65. The upper pump housing and the diffuser may be removed as a single unit by taking out the bolts 49. Removal of the bolt 37 releases the impeller of the upper pump, and then the spacing support 42 can be lifted off. The macerator 67 can be lifted away from the lower pump impeller extension 25c. Any other disassembly is not necessary for cleaning purposes. Because disassembly is easy as described, the macerator may readily be renewed.

Modifications may be made in the invention without departing from the spirit of it.

The embodiments of the invention in which an exclusive property or privilege is claimed are defined as follows:

1. A pump combination for a dishwashing machine of the type having a vat with a sump, and a rotating spray arm, said combination comprising a first pump located beneath the sump to exhaust said vat and a second pump located above the floor of the sump for delivering water to said spray arm, there being a single space between said pumps above the floor of said sump through which water is delivered to both pumps, a housing member for said first pump attached beneath the floor of said sump, an impeller in said housing and having an upward extension, a plate closing the housing for said first pump and having a hole through which the extension of said impeller passes into said sump, a housing for said second pump spaced from the floor of said sump, a plate closing the bottom of the housing for said second pump, and having an opening therein for the passage of water, an impeller in the housing of said second pump and attached to the extension of the impeller of said first pump, and macerating means located within said opening of said second plate and non-rotatably attached to the extension of the impeller of said first pump.

2. The structure claimed in claim 1 wherein said macerating device is a toothed disc.

3. The structure claimed in claim 1 wherein said first mentioned plate carries a cylindrical element having a lower flange, said cylindrical element surrounding the extension of said first pump impeller, said flange being smaller in diameter than the opening through said first mentioned plate and being mounted to said plate whereby to restrict said opening to a slot of such narrow cross section as to prevent the entry of solid materials into said first pump of a size to interfere with the operation thereof.

4. The structure claimed in claim 1 wherein said first mentioned plate carries a cylindrical element having a lower flange, said cylindrical element surrounding the extension of said first pump impeller, said flange being smaller in diameter than the opening through said first mentioned plate and being mounted to said plate whereby to restrict said opening to a slot of such narrow cross section as to prevent the entry of solid materials into said first pump of a size to interfere with the operation thereof, and wherein said macerating device is a toothed disc.

5. The structure claimed in claim 4 wherein the teeth of said discs are tilted propeller-wise through a small angle and have sharp edges.

6. The structure claimed in claim 5 wherein said macerating device has teeth defined by intervening slots, the cross sectional dimension of the slots in said macerating means and the distance between the periphery of said macerating means and said hole in said second mentioned plate being such as to inhibit the entry into said second pump of solid materials of a size to affect the operation thereof.

7. The structure claimed in claim 6 wherein the space between said pumps is free and open excepting for spaced legs separating said plates and excepting for said extension of said first pump impeller and said substantially cylindrical means.

8. The structure claimed in claim 7 wherein said first pump acts upon rotation in one direction to exhaust water from said sump and acts upon rotation in the opposite direction to return water to said sump through a second hole in said first mentioned plate.

9. The structure claimed in claim 7 wherein said vat contains both an upper and a lower rack for tableware and wherein said first pump acts upon rotation in one direction to exhaust water from said vat and upon rotation in a second direction to deliver water to a spray head located in said vat beneath said upper rack.

10. In a dishwashing machine a vat having a sump and at least one rack for tableware, a first pump for exhausting water from said sump, a rotating spray arm located beneath said rack, a second pump for supplying water to said rotating spray arm, inlet means for water to said first pump, said inlet means having a restricted cross sectional dimension such that solid materials too large to be exhausted with said water by said first pump cannot enter said first pump, entrance means for said second pump and a macerating means in connection with said entrance means and acting to reduce solid materials in the water in said vat to a size capable of entering said inlet means.

References Cited by the Examiner

UNITED STATES PATENTS

| | | | |
|---|---|---|---|
| 2,711,179 | 6/1955 | Andrews | 134—186 |
| 2,729,219 | 1/1956 | Smith | 134—115 XR |
| 3,079,094 | 2/1963 | Brezosky et al. | 134—115 XR |
| 3,126,025 | 3/1964 | Aubert et al. | 134—191 X |
| 3,179,307 | 4/1965 | Duncan et al. | 134—148 X |

WILLIAM W. DYER, JR., *Primary Examiner.*

CHARLES A. WILLMUTH, *Examiner.*

R. L. BLEUTGE, H. F. PEPPER, JR.,
*Assistant Examiners.*